United States Patent [19]
Greenberg

[11] Patent Number: 4,547,804
[45] Date of Patent: Oct. 15, 1985

[54] METHOD AND APPARATUS FOR THE AUTOMATIC IDENTIFICATION AND VERIFICATION OF COMMERCIAL BROADCAST PROGRAMS

[76] Inventor: Burton L. Greenberg, 28 E. 10th St., New York, N.Y. 10003

[21] Appl. No.: 476,915

[22] Filed: Mar. 21, 1983

[51] Int. Cl.⁴ .......................... H04N 7/08; H04N 7/00
[52] U.S. Cl. ...................... 358/142; 358/84; 358/147; 455/67
[58] Field of Search ................... 358/84, 86, 142, 147; 455/2, 67

[56] References Cited

U.S. PATENT DOCUMENTS

| | | | |
|---|---|---|---|
| 3,733,430 | 5/1973 | Thompson et al. | 358/84 |
| 3,919,479 | 11/1975 | Moon et al. | 358/84 |
| 4,025,851 | 5/1977 | Haselwood et al. | 358/84 |
| 4,230,990 | 10/1980 | Lert, Jr. et al. | 358/84 |
| 4,250,524 | 2/1981 | Tomizawa | 358/84 |
| 4,361,851 | 11/1982 | Asip et al. | 358/84 |

Primary Examiner—Tommy P. Chin
Assistant Examiner—Michael D. Parker

[57] ABSTRACT

An improved method and apparatus for identifying and verifying the proper airing of television broadcast programs is disclosed wherein from the television broadcast, it can be assured that the programs were televised and received properly and aired at the scheduled time. The invention disclosed utilizes prerecorded or live video programs in which imprinted on a preselected scanning line is a digital encoded identifying number. These video programs with digital encoding are then distributed to network and/or local broadcast stations to be televised with this identification. A plurality of selected aired television channels are then automatically simultaneously monitored at a typical reception site whereby the encoded broadcast is appraised as to the quality of its audio and video, identified and timed, and which information is then stored for a later comparison to that which was actually intended to be aired.

18 Claims, 5 Drawing Figures

METHOD AND APPARATUS FOR THE AUTOMATIC IDENTIFICATION AND VERIFICATION OF COMMERCIAL BROADCAST PROGRAMS

BACKGROUND OF THE INVENTION

1. Field of Invention

This invention relates generally to an improved method and apparatus for automatically identifying and verifying television broadcast programs. More particularly, this invention relates to an improved method and apparatus whereby the television programs are encoded with a digital identification code and then broadcasted on a number of channels. These channels are automatically simultaneously monitored at a typical reception site whereby the encoded programs are checked for audio and visual quality, identified and timed, and this information is then stored in a computer for later access and comparison with a main computer.

Television broadcast programs are comprised essentially of first run or syndicated feature programs and commercials, wherein said broadcast programs are either performed live or pre-recorded for airing at certain times for specific stations. Commercials, as an example for exhibition on television, often consist of about a 30 second program which is inserted at various times during the viewing day by the station according to contracts made with the commercial owner or advertising agency. This is referred to as buying television time spots. Pursuant to a contract, the television station arranges to insert the commercial program in certain times arranged as part of that contract. From time to time, the television station then bills the buyer of the time spot for having aired the commercial. The practice over many years has been that a statement is made by the television station under oath to the effect that the commercials were aired at the times bought and that said airing was within the terms contracted. Upon receipt of the sworn statement and the bill, those documents are compared manually, and if they match correctly the commercial time spot is paid for. However, not all commercials are aired properly and/or at the proper time. This occurs for many different reasons at each of the stations. Therefore, it has become a practice to audit these airings by visual observation. Such auditing is very time consuming, labor intensive and tedious since it is necessary to monitor all of the channels in any particular area on a round the clock basis. As such, only samplings are done for auditing purposes. Specifically, such sample auditing is by contract, and conducted by employees who record what they saw on the television and return such records to their employer for collation and reporting. As can well be imagined, because of the labor intensive nature of the sample auditing it is very expensive and not always reliable.

A further characteristic of the current practice is that because auditing is done directly by people, and not automated, there is a significant time delay in reporting and collating the audits. This delay impedes the advertiser from taking timely action to have any problems as to their commercial corrected. Thus the advertiser is unable to forestall continuous improper airing and wasteful television commercial time.

In addition, this delay in reporting and collating further delays the forwarding of the sworn statements on which payment of the advertising time relies. Therefore, there is a significant time lag for which payment is not made and this results in a loss of the use of the money during that delay time period.

While the forementioned has specifically discussed the particulars of identification and verification regarding commercials, similar particulars exist for feature programing.

Thus, there is a long felt need for a quick, total verification of television broadcast programs, which would serve to upgrade the performance of the transmitting stations and confirm the program airing schedules.

2. Description of the Prior Art

Attempts at automatic program airing verification are known in the art. Methods have been developed for automatic identification systems of programs, including identification coding and pattern recognition, but these methods are substantially limited and have not been entirely satisfactory.

Program identification coding methods have been divided into two general areas, audio and video encoding. Audio encoding (e.g. U.S. Pat. No. 3,845,391, Crosby) has proven to be unsatisfactory for television broadcasting. In the final report of the Ad Hoc Committee On Television Broadcast Ancillary Signals Of The Joint Committee On Intersociety Coordination (published May, 1978), the Journal Of The Society Of Motion Picture and Television Engineers found the aforementioned audio program identification to be extremely unreliable and caused significant degradation of program signal quality.

Video encoding has also proved to be less than satisfactory for television broadcasting. In U.S. Pat. No. 4,025,851 to Haselwood et al. for network clearance monitoring, a 48 character digital code is placed onto the vertical blanking interval of line 20. While the use of line 20 reduced the degradation of the program signal quality, the encoding system used therein is overly complex and inadequate. This system utilizes a changed line format for the handling of the data, which requires complex data processing, encoding, storage and verification. In addition, the system is only able to monitor the broadcast of a single network with an inability to scan more than one channel. Moreover, only a method and system for the identification of the program is disclosed with there being no teaching as to the integration and recording of information as to the program's audio and visual quality.

SUMMARY OF THE INVENTION

Accordingly, one object of the present invention is to provide a novel and improved method and apparatus for automatic television broadcast program identification and verification.

Another object is to provide a novel and improved method and apparatus for automatic television broadcast program identification and verification that minimizes the amount of data processing required.

A further object is to provide a novel and improved method and apparatus for automatic television broadcast program identification and verification that can monitor one or more channels at a time.

A still further object is to provide a novel and improved method and apparatus for automatic television broadcast program identification and verification wherein the program data generates subsequent data which is stored locally and later remotely accessed by a main computer for comparison.

This application provides a process for identifying and verifying the proper airing of television broadcast programs wherein there is an identifying code placed on each frame of each of the programs which code is not readily visible to a person viewing the same. The process provides for the receipt of the programs from transmitting stations for a number of select channels and searching the frames of these aired programs to verify the presence of the identifying code, and if detected the code is recorded for each frame read. The time of reading the first and last frame of the program is also recorded, and both the code and time information is directed to a memory. In addition to the above, the presence of proper audio and video is also determined. If the audio and video are proper, that information is also directed to a memory so that there is stored in that memory proof that the encoded program was aired with proper audio and video, at a certain time, and for a certain length of time. This information is identified as "verified airings" or verified signals. As a further part of the process, there is placed into another memory, a program airing schedule, which contains the aired time of day, the channels, and length of time of the program intended to be aired and the buyer of such network time. This information is identified as "bought airings" or reference signals. Thereafter, the "verified airings" are compared with the "bought airings" so as to produce an analysis of that which was bought to that which was actually properly aired.

BRIEF DESCRIPTION OF THE DRAWINGS

These and other objects and features of the invention will become apparent with reference to the following specification and to the drawings wherein.

DETAILED SPECIFICATION

Figure 1:
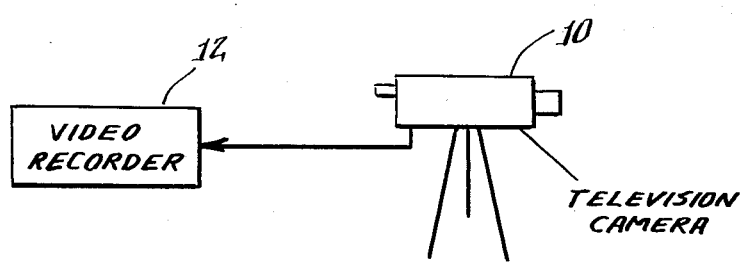
FIG. 1 is a block diagram of a video recording arrangement utilized in practicing the invention.

Referring now to FIG. 1, a video camera 10 is shown for generating a video signal having an informational content. The informational content comprises program matter such as a feature, commercial or other form of information which is to be transmitted by a television station in a market area to a receiving station in the area. The camera 10 includes means for generating a composite signal having a video information component and scanning control components. The latter include horizontal and vertical synchronizing signal components and horizontal and vertical beam blanking components. The latter components, as is well-known, blank the electron beam in a cathode-ray tube at the receiving station during the retrace interval of the scanning electron beam. In accordance with the NTSC signal, the composite signal is transmitted at a rate of 30 frames per second. Each frame comprises two interlaced fields and the field rate is 60 fields per second. At the completion of each field, the beam is blanked by a vertical blanking signal and the beam retraces to restart a subsequent field. The composite video signal is coupled from the video camera 10 to a video recorder 12. The video information content of the program can thus be recorded on magnetic tape by the recorder 12, if so desired.

Figure 2:
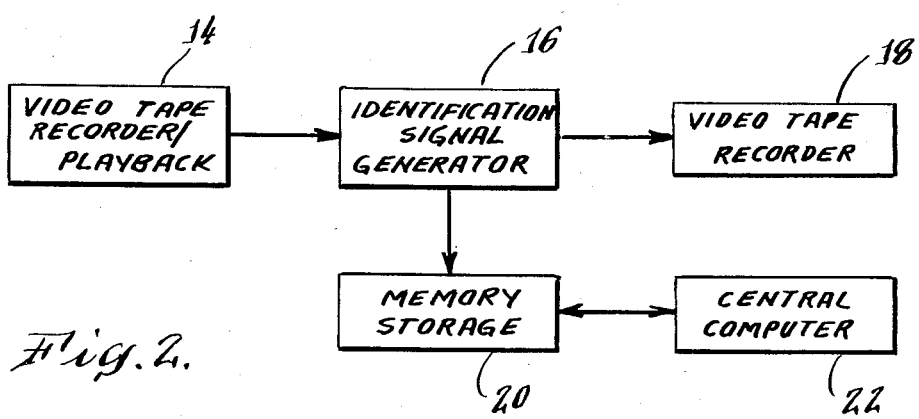
FIG. 2 is a block diagram of an arrangement for generating and combining an identification signal with a video signal.

The video program if recorded, is copied at a dubbing studio. A number of copies of the program are made depending on the determined distribution requirements for the particular program. As illustrated in FIG. 2, the recorded program comprises a master tape which is loaded on a standard video tape playback apparatus 14, commercially available from the Ampex, Sony or RCA. The video signal which is read from the tape by this machine is coupled via an encoder and a character generator 16 to a video tape recorder 18. The encoder and character generator 16 strips out the video portion of line 20 of fields 1 and 2 and inserts a many bit signal identification component on line 20 both during the sweep and blanking intervals. In one specific embodiment, this signal identification component is a seven bit digital code. The composite signal thus applied to the video recording apparatus 16 includes an identification component which identifies the video information. This identification code is also supplied to the storage means 20 of a computer means 22. The computer means 22 will include further information referenced by the identification code. Such information includes, for example, the name of the client on whose behalf the program is prepared, the name of the purchasers of the bought airings, or the service or product being advertised, etc. Use of this reference signal thus stored is described hereinafter.

Copies of the programs thus recorded are supplied to various television stations around the country for transmission in particular selected market areas. It will be appreciated that different programs having different video information identification codes will be supplied to television stations in a same market area and at times will be transmitted over different communication channels to receiving stations in the market area.

While the method of the above encoding has been described using prerecorded television broadcast programs, it is also possible to encode the signal for live broadcasts. In such an arrangement the signal from the television camera 10 would be supplied directly to the identification signal generator 16 for encoding, and would then be transmitted directly without taping. Furthermore, the identification code would still be placed in the storage memory 20 and computer 22 for later access and verification.

Figure 3:
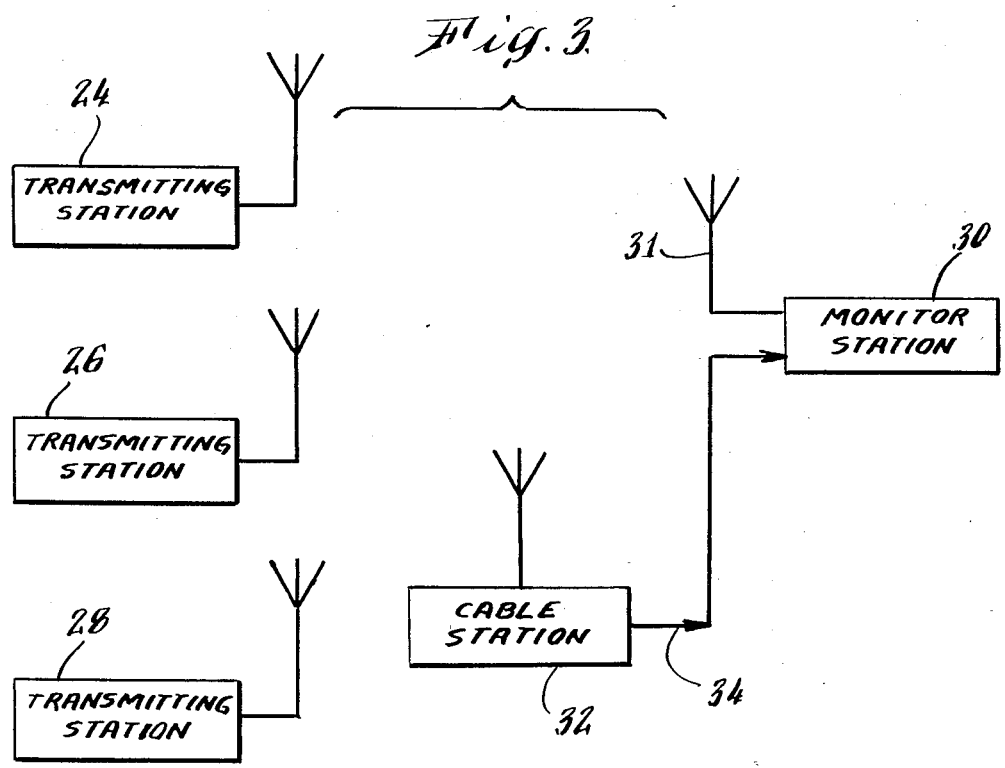
FIG. 3 is a diagram illustrating a plurality of sending stations for transmitting composite signals in a market area to a receiving station.

FIG. 3, illustrates three television sending stations 24, 26 and 28 which service a market area. A composite signal modulates an RF carrier signal and is broadcast by the stations 24, 26 and 28. A monitoring receiving station 30 is provided in the market area and is adapted to receive the different signals from the stations 24, 26 and 28. A cable T.V. station 32 is also provided which is adapted to receive the signals from stations 24, 26 and 28 by broadcast or by satellite communication. The signals received by cable station 32 are amplified and transmitted over a cable transmission line 34 to the monitor station 30 as well as to other receiving stations in the market area. For purposes of this specification and the appended claims, the term "transmit" refers both to broadcasting and to transmission of composite signals over transmission lines such as the cable 34.

Figure 4:
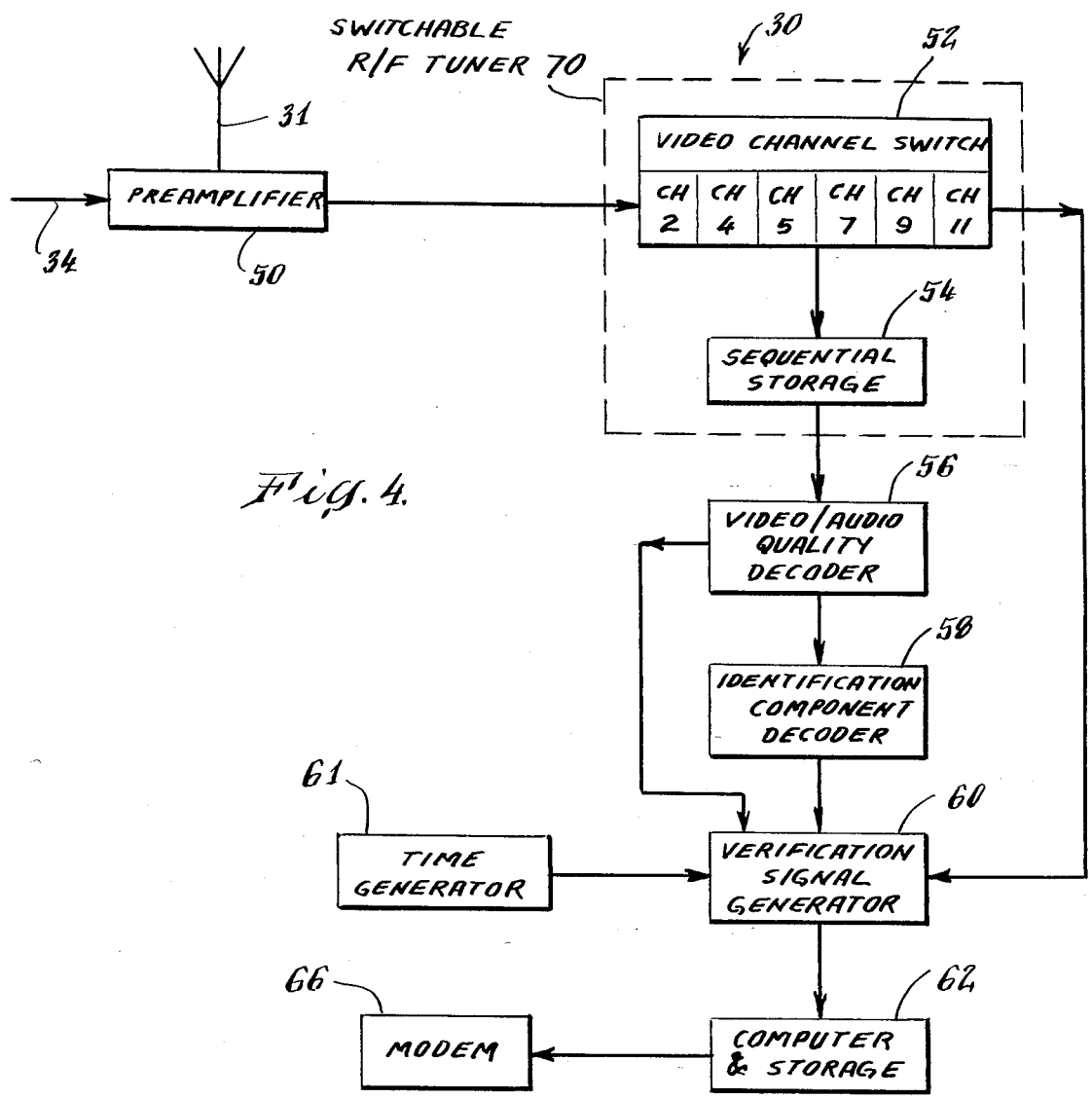
FIG. 4 is a diagram, partly in block form, of a receiving station in accordance with the invention; and, FIG. 5 is a diagram in block form of an arrangement for comparing a verification and reference signal.

As illustrated in FIG. 4, a broadcast signal which is induced in the antenna 31 or is received via the cable 34 at the monitor receiver station 30, is coupled by a preamplifier 50 to a switchable RF tuner 70. The switchable tuner 70 is comprised of a video channel switch 52 and sequential storage means 54. The video channel switch 52, shown in FIG. 4, to be adapted to switch sequentially between six different T.V. communication channels. The channels illustrated are those for the metropolitan New York City, N.Y. area. Depending on the market being serviced, the switchable tuner 52 may be adapted to include more or less channels as required. A suitable channel switch is available commercially from Channelmatic Inc, of Alpine, Calif. The channel switch 52 is switched sequentially between these channels at a rate for providing that each channel is scanned for a predetermined interval during a predetermined period of time. For example, each channel can be scanned for 1/10 second during each successive second. At a frame rate of 30 frames per second, 3 frames of the video information received on each channel will be examined. The composite signal from these frames is then stored in a sequential storage means 54 within the switchable RF tuner 70. The sequential storage means 54 stores the composite signal from a switched channel for the period equivalent to the switching period. In the example given, three frames would be temporarily stored.

The composite signal thus stored and the associated audio signal are coupled to a video/audio quality detector 56 for sensing the level of the DC component of the signals and for generating an output signal indicative of video and audio quality. A presence detector of this type is commercially available from Channelmatic Inc., of Alpine, Calif. The composite signal is subsequently applied to an identification component detector 58 which detects the seven bit identification component and supplies the digital code thus detected to a verification signal generator 60. The output signal of detector 56 indicating video and audio quality is also supplied to generator 60, as may be seen with reference to FIG. 4.

Input signals to the verification signal generator 60 thus comprise the digital identification code, the signal indicative of video and audio quality, and a signal from a time signal generator 61 which indicates the date, the time of day, and the length of time for which the identification code was decoded. Such time signal generation is well known in the art, and one such time code generator is commercially available from Datum Inc., of Anaheim, Calif.

In addition, the channel switch 52 generates and provides an electrical indication of the particular channel on which the detected identification code was received. The verification signal produced by generator 60 thus includes the identification code, the channel identification, the time information and an indication as to the video and audio quality of the transmitted signal. The verification signal is thus applied to the storage means of a local computer means 62. The computer 62 stores this information until such time as it is queried by the central computer 22.

The assembly of this bought airing information is accomplished within the predetermined scanning interval which in this example is 1/10 second. In a different embodiment, this predetermined interval could be 1/30 second or less, depending on the accuracy of verification that is desired.

When the assembly of this information is complete, the video channel switch 52 then automatically switches to the next selected channel, restarting the identification process. The process is subsequently repeated for all those selected channels wherefore it returns to first monitored channel to start the identification process over for the next consecutive second.

Figure 5:
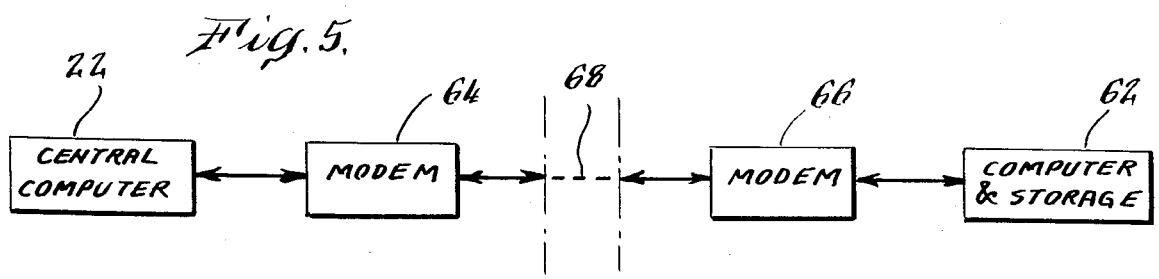

FIG. 5 illustrates communication between the central computer 22 and the computer 62. Each of these computers is coupled via modems 64 and 66 to a telephone transmission line 68. At a predetermined time, either on a daily, bi-daily or other time basis, the central computer 22 will generate an inquiry signal which causes the computer 62 to transmit the verification signals which it has stored over a period of time from the station 30 to the central computer 22. The central computer 22 will then compare the verification signals with the stored reference signals thus verifying the transmission and quality of the transmitted signals. Reference signals stored in the central computer 22 for which no verifying signal is present, will be indicated to have been not transmitted, and appropriate follow-up action can then be taken. While a single market area was illustrated with respect to the transmitting and receiving stations of FIG. 3, the central computer 22 can sequentially query receiving stations in a number of different market areas, and thus provides a means for centrally correlating information with respect to the transmission of signals throughout the country.

The method and apparatus thus described are advantageous in that comprehensive auditing of transmitted video information is automatically accomplished. The automatic auditing is accomplished economically and rapidly thus enabling prompt follow-up with indications of faulty transmission that are received. The prompt follow-up enhances the billing and payment for aired time.

While there has been described a particular embodiment of the invention, it will be apparent to those skilled in the art that variations may be made thereto. By way of example only, eliminating the need for the channel identification code to be either generated or made a part of the verification signal is apparent where only one channel exists in the market or only one particular channel is being monitored on a dedicated basis. Such variations may be made without departing from the spirit of the invention and the scope of the appended claims.

I claim:

1. A method for automatically identifying and verifying the proper airing of a television program comprising:
    (a) placing an identification code on a select line of each frame of a television program;
    (b) forming and storing a reference signal in a first memory said reference signal containing verified airings information referenced to the identification code on said coded program to be bought airings,
    (c) transmitting, as a composite signal, said coded program from one or more sending stations over one or more channels in a receiving area;
    (d) receiving each said composite signal of said channels;
    (e) scanning automatically one or more of said channels to detect the presence of said identification code and a proper audio and video portion of each received composite signal;
    (f) separating the detected identification code from each said received composite signal;
    (g) generating an electrical time signal;
    (h) generating a channel identifying signal;
    (i) forming a separate verification signal for each separated identification code by combining said separated identification code, said time signal and said channel identification signal;

(j) storing each said verification signal in a second memory as said verified airings, and (k) playing out of said first and second memories the information stored therein to compare and match said verified airings with the bought airings and making therefrom a list of the number of verified airings that were bought airings and the number of bought airings for which there is no verified airing.

2. The method of claim 1 wherein said identification code comprises a digital signal.

3. The method of claim 2 wherein said digital signal is a one or more bit identification code.

4. The method of claim 3 wherein said digital signal is a 7 bit identification code.

5. The method of claim 2 wherein said digital signal is encoded on line 20 of fields 1 and 2.

6. The method of claim 1 including steps of sensing an electrical characteristic of each said received composite signal to determine the quality of the video portion of each said received composite signal and generating an electrical signal to be stored in the second memory indicating the video quality of each said received composite signal.

7. The method of claim 5 including steps of sensing an electrical characteristic of said received composite signal to determine the quality of the audio portion of each said received composite signal and generating an electrical signal to be stored in the second memory indicating the audio quality of each said received composite signal.

8. The method of claim 1 wherein said time signal indicates the day, time of day, and the length of time at which said identification code was received.

9. The method of claim 1 including a step of forming a plurality of copies of said television program having said video portion and said identification code stored thereon.

10. The method of claim 1 including a step of periodically scanning each channel for a predetermined interval of time.

11. The method of claim 9 wherein each of said channels is repetitively scanned for an interval of one or more frames.

12. The method of claim 1 wherein the number of scanned channels is more than one.

13. In a system wherein composite electrical signals having a video information component and a scanning control component are transmitted within a reception area by one or more stations over different communication channels to a plurality of remote receiving stations within a reception area, apparatus for verifying the transmission of the video information component between the sending and receiving stations, comprising:

(a) means for forming composite electrical signals having said video information component, a periodically recurring identification component, and a periodically recurring scanning control component, said identification component encoded to identify the informational content of said video component;

(b) means for forming and storing a reference signal, said reference signal including said identification component;

(c) means for transmitting said composite signals from one or more of said sending stations over one or more of said channels to receiving stations located in said receiving area;

(d) a plurality of signal receiving means for receiving the composite signals of different channels;

(e) means for scanning said plurality of signal receiving means at a receiving station for detecting reception of said composite signal on one or more of said channels;

(f) means for separating the identification component from each detected composite signal;

(g) means for generating an electrical time signal;

(h) means for generating a channel identifying signal;

(i) means for forming a separate composite verification signal for each separated identification component by combining said separated identification component, said time signal and said channel identification signal;

(j) means for storing each said verification signal;

(k) means for comparing each said stored verification signal and said reference signal; and (l) means for providing an indication upon correspondence between said verification and reference signal thereby verifying the transmission of said video information component from said sending station to said receiving station.

14. A method for automatically identifying and verifying the proper airing of a television program comprising:

(a) placing an identification code on a select line of each frame of a television program;

(b) transmitting, as a composite signal, said coded program from one or more sending stations over one or more channels in a receiving area;

(c) receiving each said composite signal of said channels;

(d) scanning automatically over one or more of said channels to detect the presence of said identification code;

(e) separating the detected identification code from each received composite signal;

(f) forming a separate verification signal for each separated identification code; and (g) comparing each said verification signal with a predetermined reference signal to identify and verify said airing.

15. A method for automatically identifying and verifying the proper airing of a television program comprising:

(a) placing an identification code on a select line of each frame of a television program;

(b) forming and storing a reference signal in a first memory which signal contains verified airings information referenced to the identification code on said coded program to be bought airings;

(c) transmitting, as a composite signal, said coded program from one or more sending stations over one or more channels in a receiving area;

(d) receiving each composite signal of said channels;

(e) scanning automatically one or more of said channels to detect the presence of said identification code;

(f) separating the detected identification code from each received composite signal;

(g) generating an electrical time signal;

(h) forming a separate verification signal for each separated identification code by combining said separated identification code and said time signal;

(i) storing each said verification signal in a second memory as said verified airings; and (j) playing out of said first and second memories the information stored therein to compare and match said verified airings with the bought airings.

16. The method according to claim 15, further including the step of generating a list of the number of verified airings that were bought airings and the number of bought airings for which there is no verified airing.

17. A method for automatically identifying and verifying the proper airing of a television program comprising:

(a) placing an identification code on a select line of each frame of a television program;

(b) forming and storing a reference signal on a first memory which signal contains verified airings information referenced to the identification code on said coded program to be bought airings;

(c) transmitting, as a composite signal, said coded program from one or more sending stations over one or more channels in a receiving area;

(d) receiving each composite signal of said channels;

(e) scanning automatically one or more of said channels to detect the presence of said identification code;

(f) separating the detected identification code from each received composite signal;

(g) generating an electrical time signal;

(h) generating a channel identifying signal;

(i) forming a separate verification signal for each separated identification code by combining said separated identification code, said time signal, and said channel identification signal;

(j) storing each said verification signal in a second memory as said verified airings; and (k) playing out of said first and second memories the information stored therein to compare and match said verified airings with the bought airings.

18. In a system wherein composite electrical signals having a video information component and a scanning control component are transmitted within a reception area by one or more stations over different communication channels to a plurality of remote receiving stations within a reception area, apparatus for verifying the transmission of the video information component between the sending and receiving stations, comprising:

(a) means for forming composite electrical signals having said video information component, a periodically recurring identification component, and a periodically recurring scanning control component, said identification component encoded to identify the informational content of said video component;

(b) means for forming and storing a reference signal, said reference signal including said identification component;

(c) means for transmitting said composite signals from one or more of said sending stations over one or more of said channels to receiving stations located in said receiving area;

(d) a plurality of signal receiving means for receiving the composite signals of different channels;

(e) means for scanning said plurality of signal receiving means at a receiving station for detecting reception of said composite signal on one or more of said channels;

(f) means for separating the identification component from each detected composite signal;

(g) means for generating an electrical time signal;

(h) means for forming a separate composite verification signal for each separated identification component by combining said separated identification component and said time signal;

(i) means for storing each said verification signal;

(j) means for comparing each said stored verification signal and said reference signal; and (k) means for providing an indication upon the correspondence between said verification and reference signal thereby verifying the transmission of said video information component from said sending station to said receiving station.

* * * * *